(12) United States Patent
Dzieciol et al.

(10) Patent No.: US 11,053,796 B2
(45) Date of Patent: Jul. 6, 2021

(54) TURBOMACHINE MODIFICATION APPARATUS AND METHOD

(71) Applicant: General Electric Company, Schenectady, NY (US)

(72) Inventors: Piotr Krzysztof Dzieciol, Warsaw (PL); Piotr Edward Kobek, Warsaw (PL); Szymon Perkowski, Warsaw (PL); Mateusz Dolecki, Warsaw (PL)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 16/279,355

(22) Filed: Feb. 19, 2019

(65) Prior Publication Data

US 2020/0024949 A1    Jan. 23, 2020

(30) Foreign Application Priority Data

Feb. 20, 2018 (EP) .................................. 18461518

(51) Int. Cl.
*F01D 11/12* (2006.01)
*F01D 5/00* (2006.01)

(52) U.S. Cl.
CPC ............ *F01D 5/005* (2013.01); *F01D 11/127* (2013.01); *B23C 2228/25* (2013.01); *F05D 2230/10* (2013.01); *F05D 2230/80* (2013.01); *F05D 2240/11* (2013.01)

(58) Field of Classification Search
CPC ...... F01D 5/005; F01D 11/127; F01D 25/285; B23C 2228/25; B23C 3/02; F05D 2230/10; F05D 2230/80; F05D 2240/11
See application file for complete search history.

(56) References Cited

U.S. PATENT DOCUMENTS

| 2013/0167375 A1 | 7/2013 | Roesing et al. |
| 2013/0168927 A1* | 7/2013 | Simpson ............... F01D 11/001 277/414 |
| 2014/0223709 A1 | 8/2014 | Clark et al. |

FOREIGN PATENT DOCUMENTS

| EP | 1918524 A2 | 5/2008 |
| EP | 1918524 A3 | 5/2011 |
| EP | 3017898 A1 | 5/2016 |
| EP | 3061566 A1 | 8/2016 |

OTHER PUBLICATIONS

EP Search Report for corresponding European Application No. 18 46 1518 dated Aug. 6, 2018, 8 pages.

* cited by examiner

*Primary Examiner* — Ryan J. Walters
(74) *Attorney, Agent, or Firm* — Hoffman Warnick LLC (57) ABSTRACT

A turbomachine modification apparatus includes a machining device, and a machining device mount attached to the machining device. The machining device mount is configured to radially and axially adjust a position of the machining device. A blade mount is configured to be attached to one or more turbomachine blades. The blade mount is attached to the machining device mount.

16 Claims, 8 Drawing Sheets

TURBOMACHINE MODIFICATION APPARATUS AND METHOD

BACKGROUND OF THE INVENTION

The apparatus described herein relates generally to modification of a turbomachine part and, more specifically, to an apparatus for modifying a static seal in the turbomachine using the rotor as a motive device.

Labyrinth seals have a wide variety of uses and one such use is to effect sealing between plenums at different pressures in gas turbine engines. Such seals generally include two principal elements, i.e., a rotating seal and a static seal or shroud. The rotating seal, in cross section parallel to the axial length of the engine, frequently has rows of thin tooth-like projections extending radially from a relatively thicker base toward the static seal or shroud. The static seal or shroud is normally formed from a thin honeycomb ribbon configuration. These principal elements are generally situated circumferentially about the axial length of the engine and are positioned with a small radial gap therebetween to permit assembly of the rotating and static components. The purpose of the labyrinth seal arrangement is to minimize gas path leakage out of the primary gas path and to segregate different stages of the compressor which are at different temperatures and pressures.

To a significant extent, engine efficiency depends upon minimizing this gas leakage around rotating components by controlling the gas flow to maximize interaction between the gas stream and the components in the primary gas path. The effectiveness of the turbine engine varies directly with the proportion of gas that impinges upon the blades of the rotating member. Closer tolerances between the rotating and static seals achieve greater efficiencies. On the other hand a very tight tolerance can create a risk of vibration/flutter issues.

When the gas turbine engine is operated, the elevated temperatures of operation cause the opposed static and rotating seals, such as those in the rotating labyrinth seals, to expand in a radial direction toward each other. The rotating labyrinth seals expand radially and rub into the shroud, creating frictional contact between the thin projections of the rotating seal and the shroud. During operation, the movement of a rotating member, which has expanded due to heat, cuts into the seal creating minimal clearance. This is possible due to the fact that the seal is fabricated from a softer material than the rotating member.

The thin, honeycomb ribbon construction of the shroud is used to reduce the surface area on which the blade teeth rub while reducing the weight of the structure, and helps to minimize the heat transferred into the rotating blade teeth, while also providing the required strength. In addition, the blade teeth tips are constructed so as to be thin, in order to thermally isolate them from the supporting base structure. However, excessive heat from deep rubs (even into the honeycomb) during engine start-up and during engine excursions can damage the seals, negatively affecting durability and engine efficiency and providing a leak path for the flow of gases. Furthermore, material transfer can occur which also degrades the seal characteristics. Cutting into even low-density honeycomb cells can still cause blade tooth damage, leading to premature part retirement.

While much effort has been directed at improving the structure of the seal arrangement, there is a continuous need for improved designs for seal structures including after field validation. It is often impossible to predict how the sealing pair will behave without field tests.

BRIEF DESCRIPTION OF THE INVENTION

In an aspect of embodiments of the present invention, a turbomachine modification apparatus includes a machining device, and a machining device mount attached to the machining device. The machining device mount is configured to radially and axially adjust a position of the machining device. A blade mount is configured to be attached to one or more turbomachine blades. The blade mount is attached to the machining device mount. The blade mount includes an aft plate and a forward plate. The aft plate is configured to be placed on an aft side of the turbomachine blades and the forward plate is configured to be placed on a forward side of the turbomachine blades. Each of the aft plate and the forward plate comprising multiple grooves generally conforming to a profile of the turbomachine blades. The aft plate and the forward plate are substantially parallel to each other when installed on the turbomachine blades.

In another aspect of the present embodiments of invention, a method for modifying a static seal or shroud in a turbomachine is provided. The method includes the steps of attaching a blade mount to one or more turbomachine blades, and attaching a machining device mount to the blade mount, and attaching a machining device to the machining device mount, where the machining device includes a machining bit. A positioning step positions the machining bit in a desired location with respect to the static seal or shroud, and an activating step activates the machining device. A controlling step controls a rotor of the turbomachine so that the rotor rotates at a desired speed. Rotation of the rotor moves the machining device in an arcuate and circumferential path along the static seal or shroud thereby machining the static seal or shroud.

In yet another aspect of the present embodiments of invention, a method for modifying a static, honeycomb shroud in a turbomachine is provided. The method includes the steps of attaching a blade mount to one or more turbomachine blades, attaching a machining device mount to the blade mount, and attaching a machining device to the machining device mount. The machining device includes a machining bit, and the machining bit is configured for machining the honeycomb shroud. A positioning step positions the machining bit in a desired location with respect to the honeycomb shroud. An activating step activates (or turns on) the machining device. A controlling step controls a rotor of the turbomachine so that the rotor rotates at a desired speed. Rotation of the rotor moves the machining device in an arcuate and circumferential path along the static, honeycomb seal or shroud thereby machining the static, honeycomb shroud.

DETAILED DESCRIPTION OF THE INVENTION

One or more specific aspects/embodiments of the present embodiments of invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
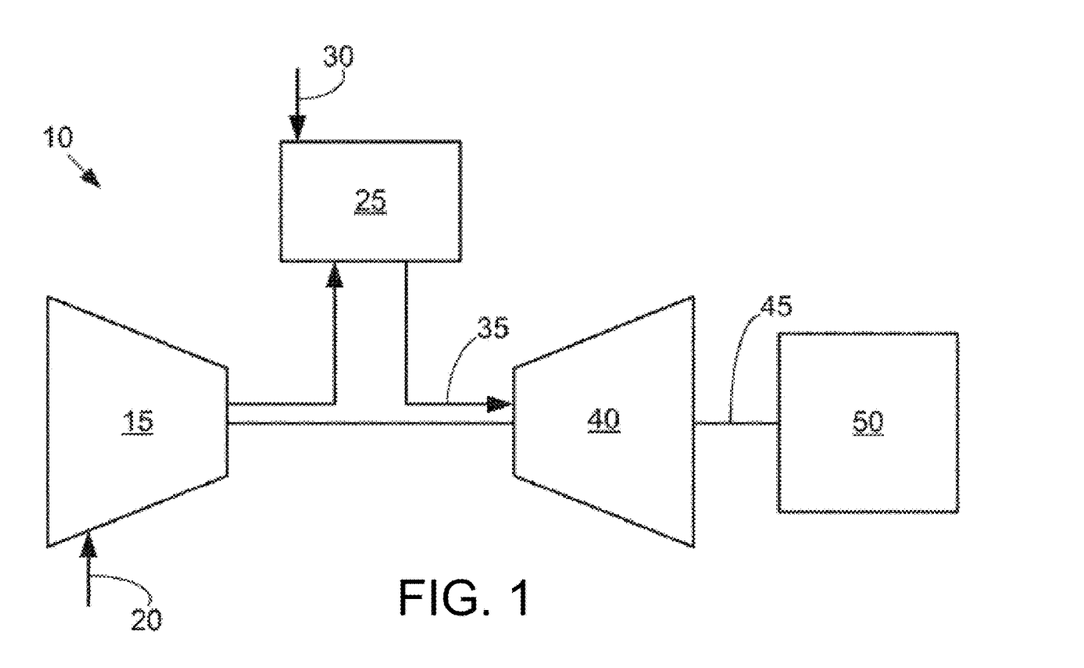
FIG. 1 is a schematic diagram of a gas turbine engine showing a compressor, a combustor, and a turbine.

Referring now to the drawings, in which like numerals refer to like elements throughout the several views, FIG. 1 shows a schematic view of a turbomachine 10 (e.g., a gas turbine engine) as may be used herein. The turbomachine 10 may include a compressor 15 that compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft/rotor 45 and an external load 50, such as an electrical generator and the like.

The turbomachine 10 may use natural gas, various types of syngas, and/or other types of fuels. The turbomachine 10 may be any one of a number of different gas turbine engines offered by General Electric Company of Schenectady, N.Y., including, but not limited to, those such as a 7 or a 9 series heavy duty gas turbine engine and the like. The turbomachine 10 may have different configurations and may use other types of components. Other types of turbomachines or gas turbine engines also may be used herein. Multiple gas turbine engines, other types of turbines, and other types of power generation equipment also may be used herein together.

The turbine 40 includes a rotating rotor (not shown) and a stationary casing (not shown) containing stationary vanes and shrouds disposed about the rotor. The rotor has multiple rows of blades (not shown) circumferentially arranged around the rotor. The combustion gases 35 act on the blades and force the rotor to rotate. The stationary casing may include seals and shrouds, such as static, honeycomb shroud (or seal) 60 formed in a stepped or two-tier configuration. The shroud 60 circumferentially extends around the rotor. The static shroud 60, in cooperation with teeth on the rotating blades, functions as a seal to minimize combustion gas leakage flow radially outward of the rotor blades.

Figure 2:
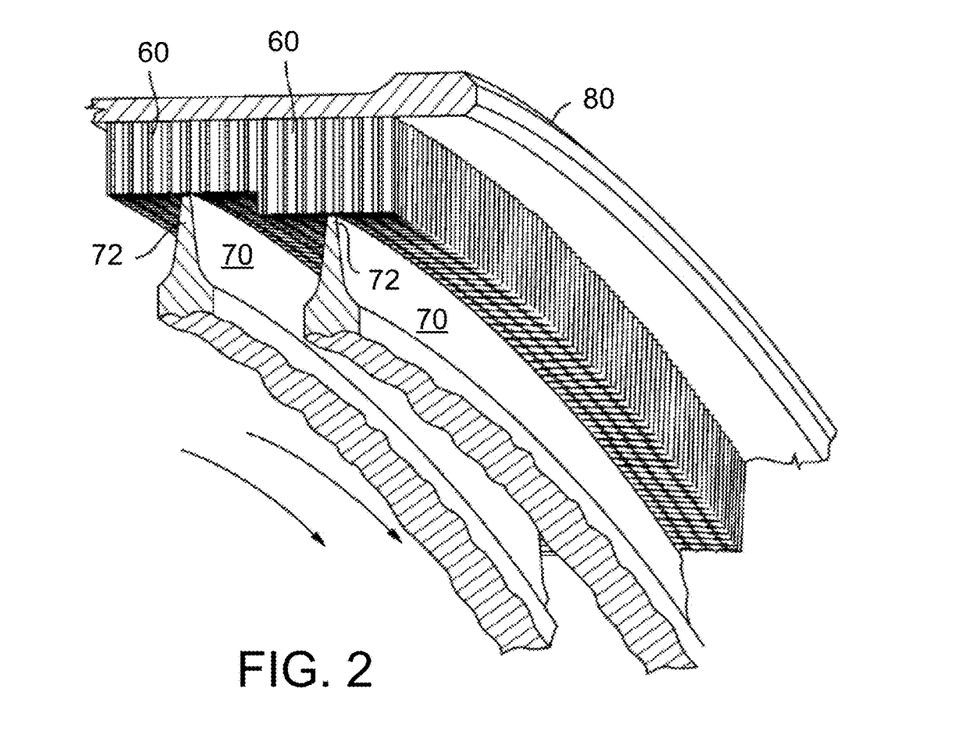
FIG. 2 illustrates a perspective view of a stepped labyrinth seal arrangement showing the teeth of the labyrinth seal adjacent the honeycomb shroud.

FIG. 2 illustrates a perspective view of a stepped labyrinth seal arrangement showing the teeth of the labyrinth seal adjacent the honeycomb shroud. The teeth 72 of the rotating labyrinth seal 70 are shown bearing against the honeycomb shroud (or seal) 60 joined to a backing strip 80 of a stepped labyrinth seal. Other engine structure has been removed for clarity. The direction of rotation of teeth 72 is perpendicular to a line drawn from a vane through the blade teeth, that is, perpendicular to the projection of the blade teeth, or into the plane of the figure substantially in the direction of the arrows. As can be seen, it is desirable for the material from the shroud 60 to be removed in the form of small frangible particles rather than by melting, which requires more energy for removal, thereby heating teeth 72.

Figure 3:
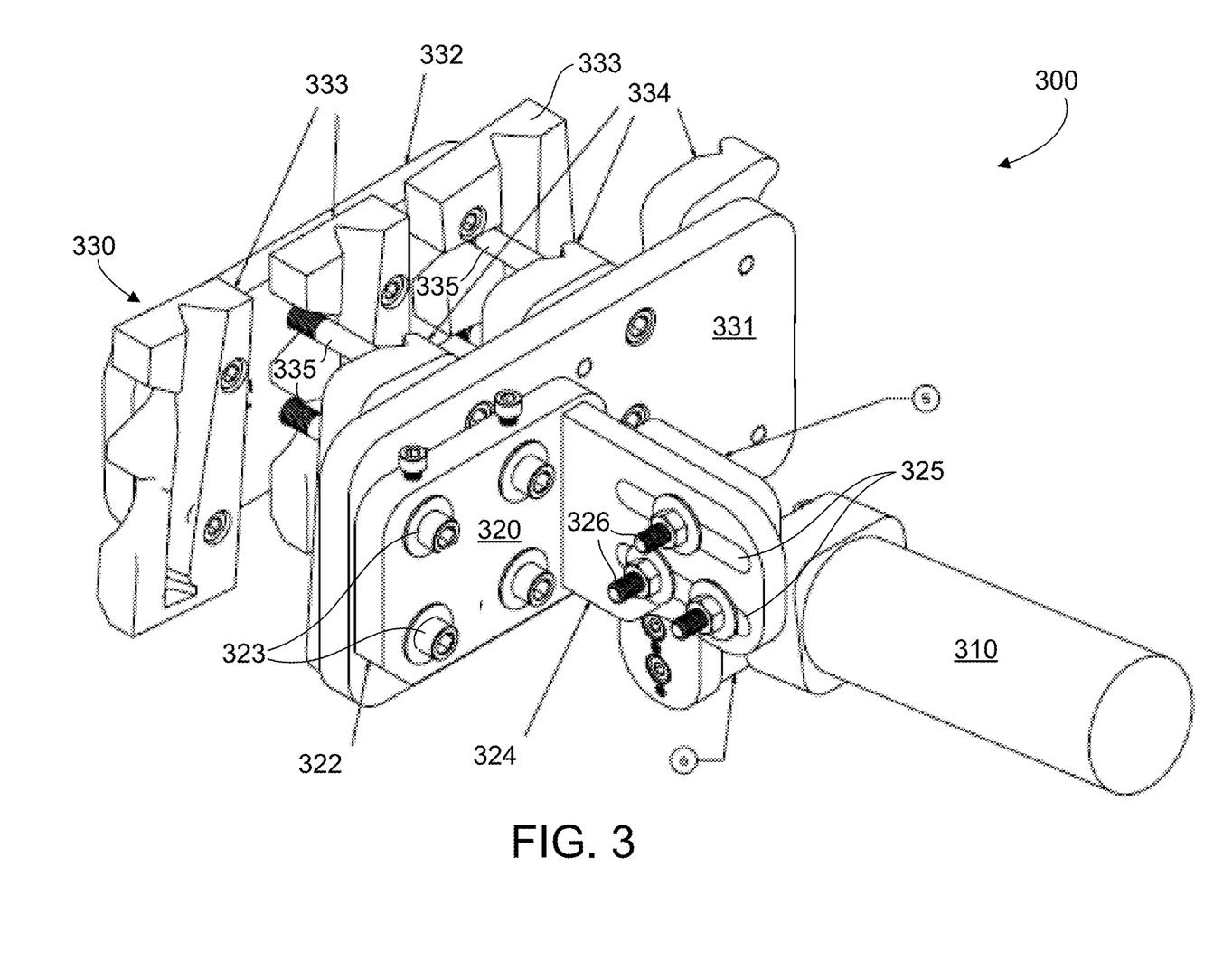
FIG. 3 illustrates a perspective view of a turbomachine modification apparatus, according to an aspect of the present disclosure.

FIG. 3 illustrates a perspective view of a turbomachine modification apparatus 300, according to an aspect of the present disclosure. The apparatus 300 is comprised of a machining device 310, a machining device mount 320 configured to be attached to the machining device 310, and a blade mount 330 configured to be attached to one or more (or multiple as shown) turbomachine or rotor blades. The machining device 310 may be a drill or grinder having a machining bit 312 attached to a distal end thereof. The machining bit is abrasive and is rotatable, and as it rotates it will grind away material from the shroud.

The machining device mount 320 includes a first plate 322 and a second plate 324, which is attached to or integrally formed with the first plate 322. The first plate 322 is configured to be attached to the blade mount 330, and includes a plurality of slots 321 (not shown in FIG. 3) through which fasteners 323 may pass. The slots 321 are elongated to permit radial adjustment (with respect to the turbomachine 10) of the mount 320 and machining device 310. When attached to multiple rotor blades, via blade mount 330, the first plate 320 can be moved up and down in FIG. 3 which translates to radial movement with respect to the turbomachine (e.g., a turbine 40). After the desired position of first plate 322 is obtained, then the fasteners 323 (four of which are shown) can be tightened. The fasteners 323 contain and enlarged head or a washer that bears against a first side of the plate 320, and the threaded, opposing end of the fasteners 323 may either screw into threaded recesses in blade mount 330 or may use a nut and washer on the opposing end (not shown) of fasteners 323. The second plate 324 may be mechanically fastened to plate 322 (e.g., by mechanical fasteners or welding), and is configured to be attached to machining device 310, Second plate 324 includes slots 325 which are generally parallel to each other. The slots permit axial adjustment (with respect to turbomachine 10 or turbine 40) of the machining device 310. For example, fasteners 326 (which are attached to machining device 310) may be slid axially forward or aft along the slots 325. Once the desired position of the machining device is obtained, the fasteners 326 may be tightened.

Blade mount 330 includes an aft plate 331 and a forward plate 332. The aft plate 331 is placed on an aft (or downstream) side of the rotor blades, and the forward plate 332 is placed on a forward (or upstream) side of the rotor blades. Portions of the rotor blade's leading and trailing edges fit into blade cushions or covers 333 and 334. Cover 333 is the forward or upstream cover, and cover 334 is the aft or downstream cover. Each rotor blade will pair with a forward cover 333 and an aft cover 334, and both covers contain grooves 336 that generally conform to a profile of the rotor blade. The aft plate 331 and the forward plates 332 may be substantially parallel to each other when they are installed on the rotor blades. In the example shown, the blade mount 330 will attach to three rotor blades, as there are three pairs of aft and forward blade covers 333, 334. A plurality of fasteners 335 are used to clamp the aft plate 331 and the forward plate on to the rotor blades.

Figure 4:
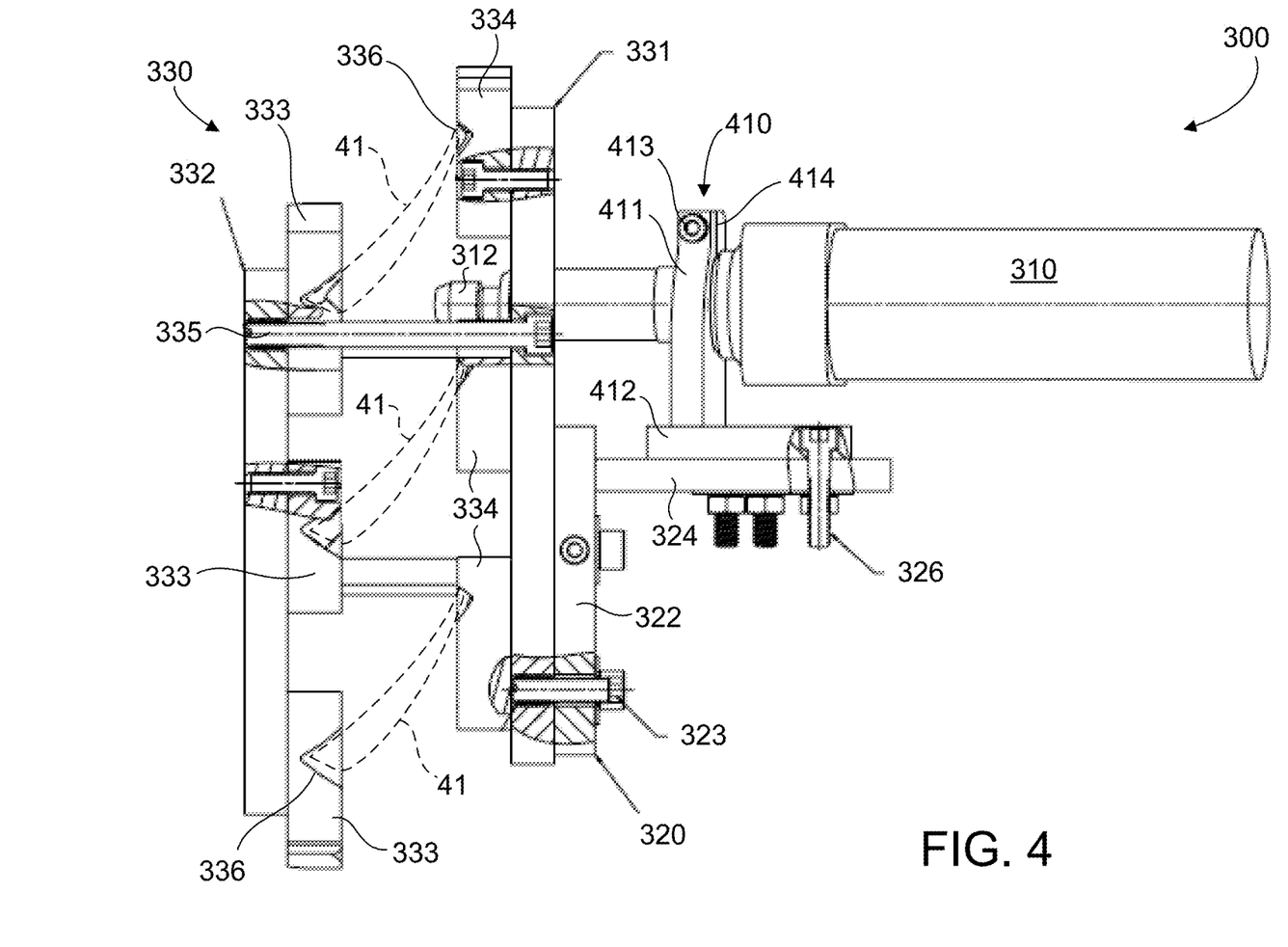
FIG. 4 illustrates a top and partial cut-away view of the apparatus installed on three rotor blades, according to an aspect of the present disclosure.

FIG. 4 illustrates a top and partial cut-away view of the apparatus 300 installed on three rotor blades. The in-situ rotor blades 41 (shown in phantom) are clamped between the forward plate 332 and aft plate 331, and portions of the leading and trailing edges of the rotor blades are in the grooves of the blade covers 333 and 334. When the fasteners 335 are tightened the blade mount 330 is securely and rigidly attached to the rotor blades 41. The blade mount acts as a secure base for machining device mount 320 and machining device 310. The machining device 310 includes a machining bit 312 that is used to machine or grind the honeycomb shroud or seal while the rotor rotates (along with apparatus 300). The machining device is attached to a bracket mount 410 comprised of clamp 411 and plate 412. The clamp 411 consists of a plate with a circular aperture (through which a portion of device 310 passes) and a slot 414 extending from the aperture to the side of the plate. The slot is closed and the aperture is tightened around the device 310 by fastener 413. In this manner, the device 310 is securely and rigidly mounted to the mount 320 and blade mount 330.

Figure 5:
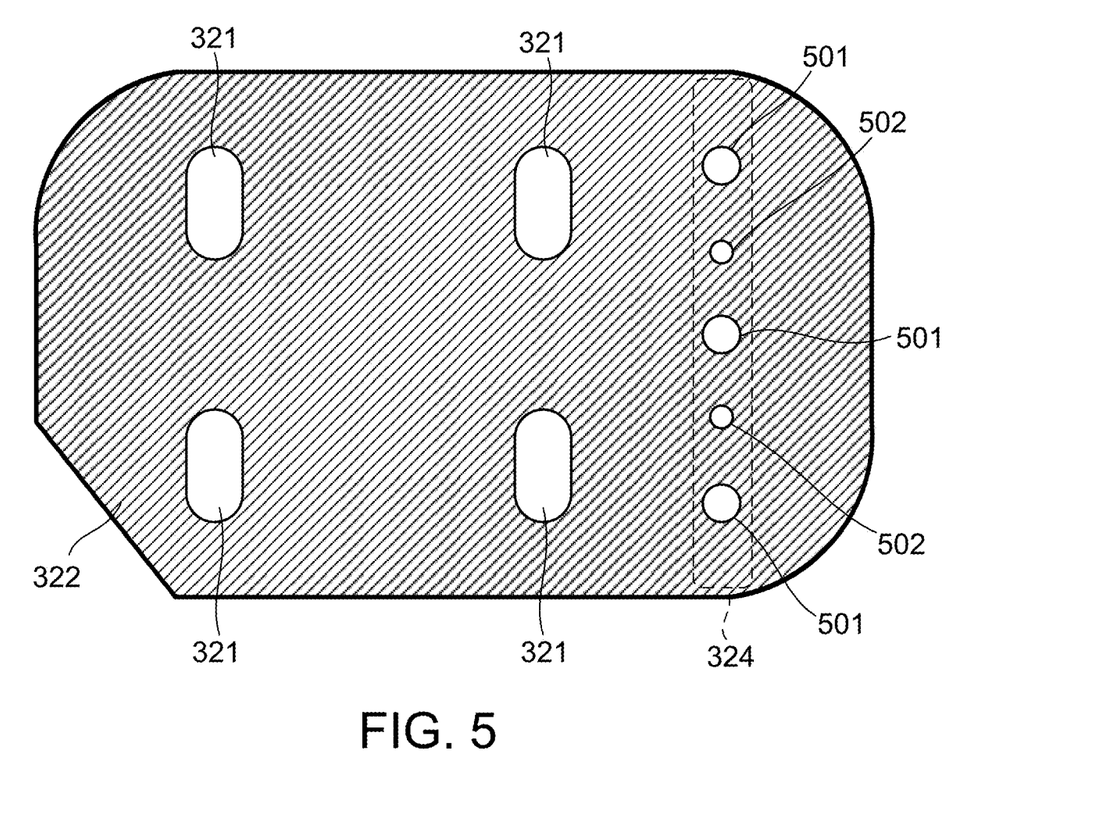
FIG. 5 illustrates a front view of the first plate 322 of the machining device mount, according to an aspect of the present disclosure.

FIG. 5 illustrates a front view of the first plate 322 of the machining device mount. Slots 321 are elongated in the vertical or radial direction, allowing for radial adjustment of the position of plate 322. The second plate 324 may be attached to the first plate 322 via holes 501 and 502. Holes 501 may be used with fasteners (not shown in FIG. 5) that screw into plate 324 (shown in phantom). Holes 502 may be used to receive dowels or projections from plate 324 that project into holes 502.

Figure 6:
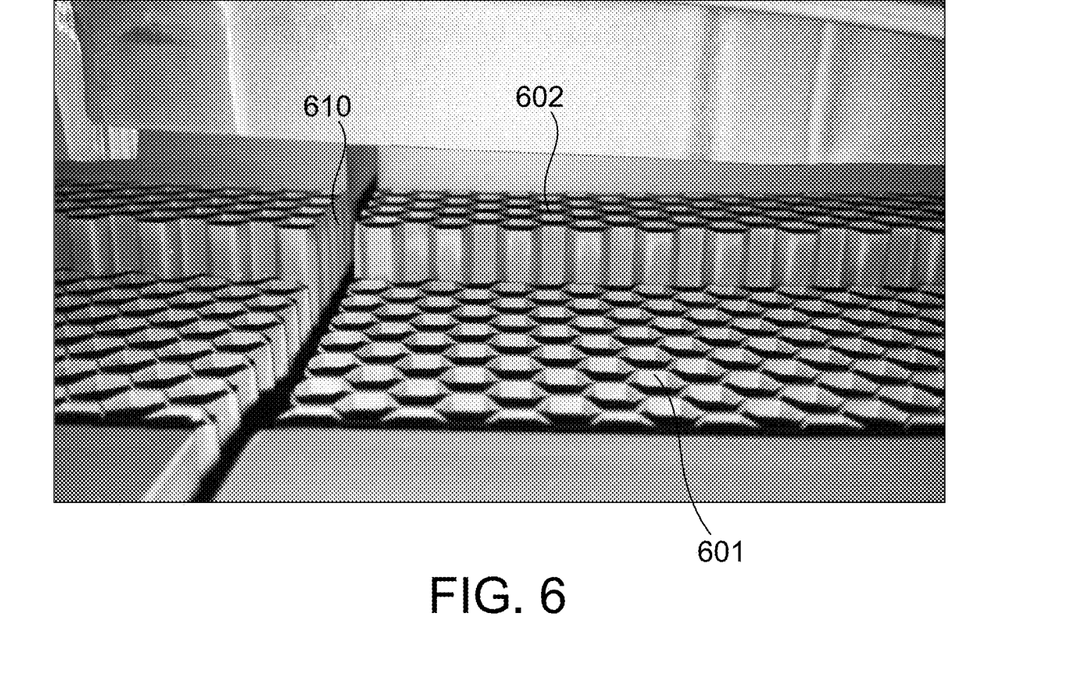
FIG. 6 illustrates a partial, perspective view of a honeycomb shroud before machining.
Figure 7:
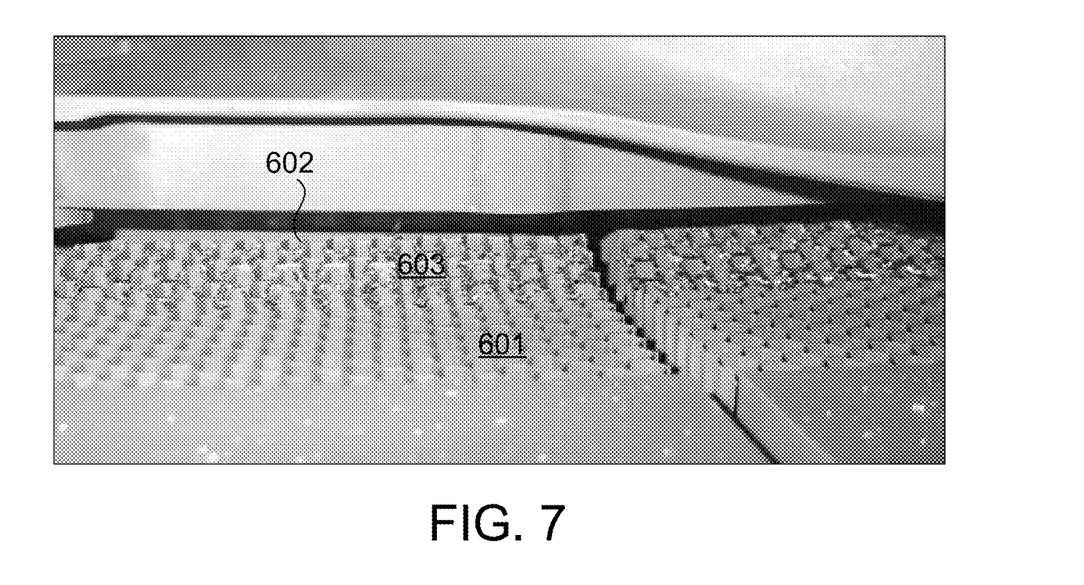
FIG. 7 illustrates a partial, perspective view of the honeycomb shroud after machining, according to an aspect of the present disclosure.

FIG. 6 illustrates a partial, perspective view of a honeycomb shroud before machining. FIG. 7 illustrates a partial, perspective view of the honeycomb shroud after machining. In FIG. 6 the shroud 60 is in the same configuration as the shroud 60 shown in FIG. 2, and it has a stepped or two-tiered configuration. This two-tiered profile has been used very often in the past, but under some operating conditions may cause rotor blade flutter. Excessive flutter experienced by turbine rotor blades can lead to rotor blade damage or machine inefficiencies. The "step" in FIG. 6 has been machined into a curved transition 603 from the radially outer land 601 of the honeycomb seal to the radially inner land 602 of the honeycomb shroud.

Figure 8:
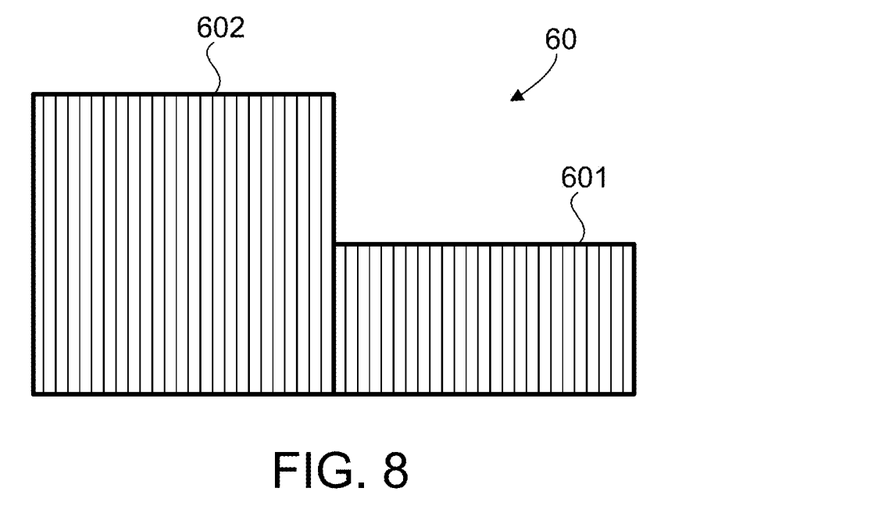
FIG. 8 illustrates a schematic side, circumferential view of the shroud before machining.
Figure 9:
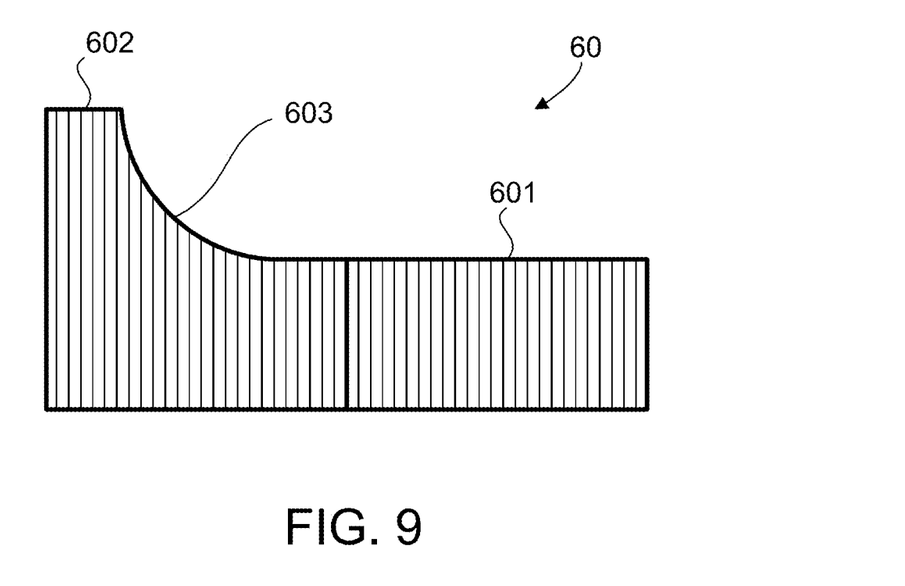
FIG. 9 illustrates a schematic side, circumferential view of the shroud after machining, according to an aspect of the present disclosure.

FIG. 8 illustrates a schematic side, circumferential view of the shroud 60 before machining. FIG. 9 illustrates a schematic side, circumferential view of the shroud 60 after machining. The curved transition 603 has been machined into the shroud portion 602 after multiple passes (revolutions) of machining bit 312. This curved transition will prevent, reduce or minimize rotor blade flutter during certain turbine operating conditions.

Figure 10:
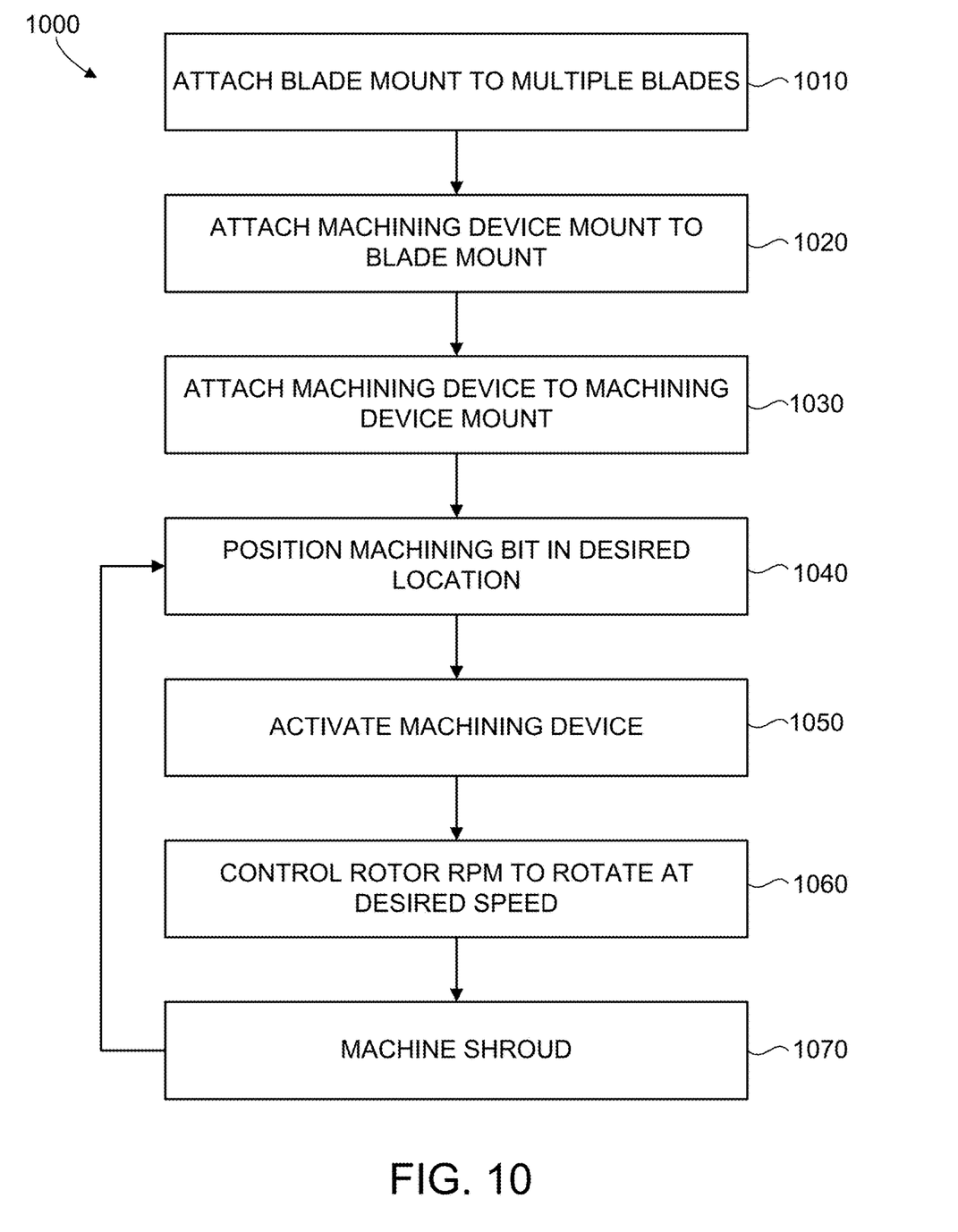
FIG. 10 is a flowchart of a method for modifying a static seal or shroud in a turbomachine, according to an aspect of the present disclosure.

FIG. 10 is a flowchart of a method 1000 for modifying a static seal or shroud in a turbomachine. In step 1010, a blade mount 330 is attached to multiple turbomachine blades 41. For example, in turbine 40 the blade mount would be attached to multiple turbine blades 41, by separating the aft plate 331 and the forward plate 331. The forward plate 332 would be slipped behind (from the technician's point of view) the turbine blades 41. The aft plate would then be placed on the opposing side of the turbine blades and fasteners 335 are used to tighten the two plates 331 and 332 together, thereby clamping the blade mount 330 to the turbine blades 41.

In step 1020, the machining device mount 320 is attached to the blade mount 330. Fasteners 323 are used to bolt the first plate 322 to the aft plate 331. In step 1030, a machining device 310 is attached to the machining device mount 320. The machining device 310 may be a drill or router (or similar device) with a machining bit 312 disposed at one end. A bracket mount 410 is used to clamp onto the machining device 310, and the bracket mount 410 is rigidly connected to plates 412, 324 and 322. It is to be understood that the order of steps 1020 and 1030 may be interchanged, in that step 1030 may be performed before step 1020, or vice-versa.

In step 1040, machining bit 312 is positioned in a desired location with respect to shroud 60. Fasteners 323 may be loosened to permit plate 320 to be moved radially (with respect to the turbomachine) up or down, and this will correspondingly raise or lower the height of machining bit 312 with respect to the shroud 60. Once the desired height or vertical position is obtained, the fasteners 323 can be re-tightened. The axial position (with respect to the turbomachine) is adjusted by loosening fasteners 326 and sliding plate 412 (as well as machining device 310) back and forth (i.e., forward and aft) along plate 324 until the desired axial position of machining bit 312 is obtained. For example, a desired position for machining bit 312 may be in slot 610 located between two shroud sections (refer to FIG. 6). When correctly positioned in slot 610 the machining bit 312 can be activated and brought up to speed without contacting the section 602 of the shroud. Alternatively, the machining bit 312 may be activated first and then slid axially into a non-slot position in section 602, as the bit 312 will machine away material of section 602 until the desired axial depth is achieved.

Figure 11:
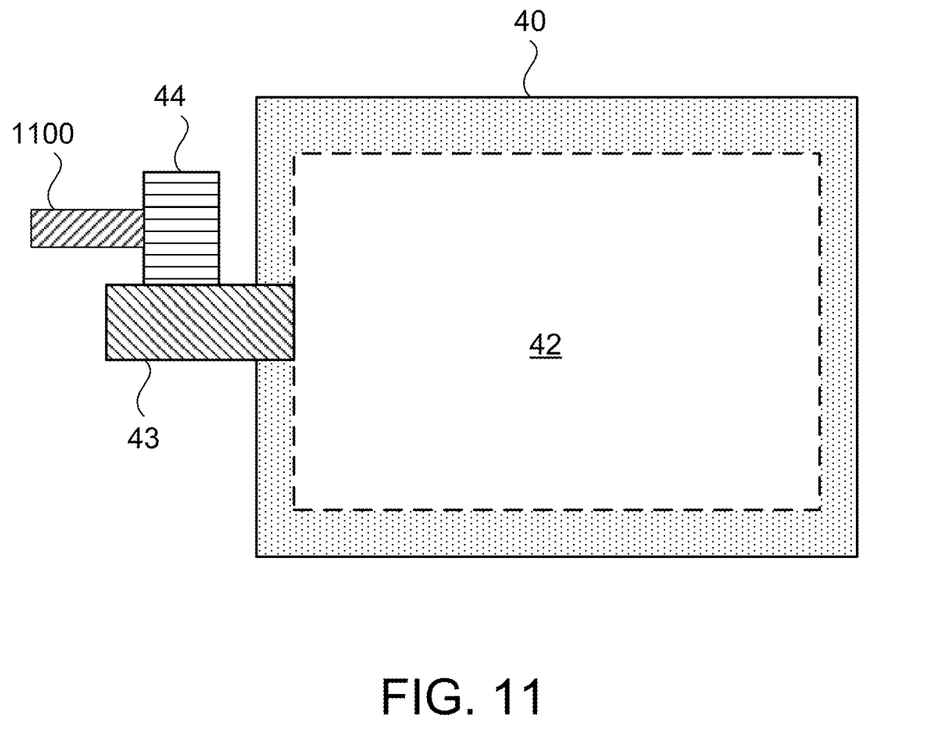
FIG. 11 illustrates a schematic view of the turning gears used to rotate the rotor of the turbine, according to an aspect of the present disclosure.

In step 1050, the machining device 310 is activated by turning it on, and this will cause the machining bit 312 to rotate. For example, if the machining device 310 is a router or drill, then the ON switch is activated on the device. In step 1060, the rotor of the turbine 40 is controlled to rotate at a desired speed. FIG. 11 illustrates a schematic view of the turning gears 44 used to rotate the rotor 42 of the turbine 40. Turning gears 44 are typically used for low speed rotation of the rotor 42 and are often used during startup of the turbine 40. The usual revolutions per minute (RPM) of the rotor being turned by the turning gears (and/or turning gear motor) 44 during startup may be about 4 RPM, and this speed is too fast for machining of shroud 60. In step 1060, the rotor 42 is controlled to rotate at a desired speed. An electric or hydraulic drill 1100 is attached to the turning gears/motor 44 and the drill 1100 rotates the turning gears at a controlled rate to obtain a rotor rotation speed of about 2 revolutions per hour to about 5 revolutions per hour (RPH). The drill 1100 reduces the typical rotor speed on turning gears from 4 RPM to 2-5 RPH (i.e., 0.03 RPM to 0.08 RPM). The turning gears 44 are connected to rotor gear 43.

In step 1070, the shroud 60 is machined by machining bit 312. The slowly moving rotor (at 2-5 RPH) allows the machining bit 312 to machine the shroud 60 at a rate within the capabilities of the machining device 310. The machining device 310 is coupled to the rotor via mounts 320 and 330. If the rotor 42 (and blades 41) moves/rotates the machining device 310 will follow. The slow rotation of rotor 42 moves the machining device 310 and bit 312 in an arcuate and circumferential path along the shroud 60, and as the bit 312 follows this path the shroud 60 is machined. After one full revolution of the rotor 42, steps 1040-1070 may be repeated as many times as desired, until machining of shroud 60 is complete. As one example only, the first pass (e.g., a full rotation of rotor) of machining bit 312 may machine 25% of the desired amount of shroud 60, so at the completion of this first pass the rotor is stopped and the machining bit is re-positioned. The drill 1100 activates the turning gears again and a second pass is completed, and this second pass obtains 50% of the desired machining for shroud 60. Accordingly, two more passes or cycles through steps 1040-1070 are needed to obtain 100% of the desired machining of shroud 60. In each of the four passes more and more of the shroud 60 was removed, and this cycle continued until the desired shroud profile was achieved. However, it is to be understood that one or more full revolutions of rotor 42 may be required to obtain the desired machined profile of shroud 60.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present embodiments of invention are not intended to be interpreted as excluding the existence of additional embodiments or aspects that also incorporate the recited features.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for modifying a static seal or shroud in a turbomachine, the method comprising:
   attaching a blade mount to one or more turbomachine blades;
   attaching a machining device mount to the blade mount;
   attaching a machining device to the machining device mount, the machining device including a machining bit;
   positioning the machining bit in a desired location with respect to the static seal or shroud;
   activating the machining device;
   controlling a rotor of the turbomachine so that the rotor rotates at a desired speed; and
   wherein rotation of the rotor moves the machining device in an arcuate and circumferential path along the static seal or shroud thereby machining the static seal or shroud; the blade mount further including:
   an aft plate and a forward plate, the aft plate configured to be placed on an aft side of the turbomachine blades and the forward plate configured to be placed on a forward side of the turbomachine blades; and
   each of the aft plate and the forward plate includes grooves generally conforming to a profile of the turbomachine blades.

2. The method of claim 1, the controlling step further including controlling the rotor to rotate at a speed of about 2 to about 5 revolutions per hour (RPH).

3. The method of claim 2, wherein a drill is attached to a turning gear motor of the rotor to obtain the rotor speed of about 2 RPH to about 5 RPH.

4. The method of claim 1, wherein the positioning, activating, controlling and machining the static seal or shroud steps are performed multiple times until a desired level of machining is obtained.

5. The method of claim 1, the positioning step further including positioning the machining bit in a gap between adjacent seal or shroud sections.

6. The method of claim 1, the machining device mount configured to radially and axially adjust a position of the machining device.

7. The method of claim 6, wherein the positioning step includes adjusting the position of the machining device in radial and axial directions with respect to the turbomachine.

8. The method of claim 1, wherein the aft plate and the forward plate are substantially parallel to each other when installed on the one or more turbomachine blades.

9. The method of claim 1, wherein the machining the static seal or shroud step is performed on a static honeycomb seal.

10. A method for modifying a static honeycomb seal or shroud in a turbomachine, the method comprising:
   attaching a blade mount to one or more turbomachine blades;
   attaching a machining device mount to the blade mount;
   attaching a machining device to the machining device mount, the machining device including a machining bit, the machining bit configured for machining the static honeycomb seal or shroud;
   positioning the machining bit in a desired location with respect to the static honeycomb seal or shroud;
   activating the machining device;
   controlling a rotor of the turbomachine so that the rotor rotates at a desired speed; and
   wherein rotation of the rotor moves the machining device in an arcuate and circumferential path along the static honeycomb seal or shroud thereby machining the static honeycomb seal or shroud, the blade mount further including:

an aft plate and a forward plate, the aft plate configured to be placed on an aft side of the turbomachine blades and the forward plate configured to be placed on a forward side of the turbomachine blades;

each of the aft plate and the forward plate comprising grooves generally conforming to a profile of the turbomachine blades; and wherein the aft plate and the forward plate are substantially parallel to each other when installed on the turbomachine blades.

11. The method of claim 10, the controlling step further including:

controlling the rotor to rotate at a speed of about 2 to about 5 revolutions per hour (RPH).

12. The method of claim 11, wherein a drill is attached to a turning gear motor of the rotor to obtain the rotor speed of about 2 RPH to about 5 RPH.

13. The method of claim 10, wherein the positioning, activating, controlling and machining the static honeycomb seal or shroud steps are performed multiple times until a desired level of machining is obtained.

14. The method of claim 8, the positioning step further including positioning the machining bit in a gap between adjacent static honeycomb seal or shroud sections.

15. The method of claim 8, the machining device mount configured to radially and axially adjust a position of the machining device.

16. The method of claim 8, wherein the positioning step includes adjusting the position of the machining device in radial and axial directions with respect to the turbomachine.

* * * * *